(12) United States Patent
Lee et al.

(10) Patent No.: US 10,171,156 B2
(45) Date of Patent: Jan. 1, 2019

(54) APPARATUS AND METHOD FOR TRANSMITTING UPLINK INFORMATION IN A BROADCASTING SYSTEM

(71) Applicants: Samsung Electronics Co. Ltd., Suwon-si, Gyeonggi-do (KR); Industry-Academic Cooperation Foundation, Yonsei University, Seoul (KR)

(72) Inventors: Hak-Ju Lee, Seoul (KR); Jong-Soo Seo, Seoul (KR); Jae-Hyeon Bae, Seoul (KR); Soon-Ki Jo, Seoul (KR); Hak-Jin Kim, Daejeon (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 150 days.

(21) Appl. No.: 14/103,429

(22) Filed: Dec. 11, 2013

(65) Prior Publication Data

US 2014/0169266 A1 Jun. 19, 2014

(30) Foreign Application Priority Data

Dec. 14, 2012 (KR) .................. 10-2012-0146642

(51) Int. Cl.
*H04B 7/14* (2006.01)
*H04B 7/155* (2006.01)
*H04H 20/42* (2008.01)

(52) U.S. Cl.
CPC .............. *H04B 7/14* (2013.01); *H04B 7/155* (2013.01); *H04H 20/42* (2013.01); *H04H 2201/37* (2013.01)

(58) Field of Classification Search
CPC ..... H04L 25/22; H04L 12/44; H04L 12/4625; H04B 7/15; H04W 84/047
See application file for complete search history.

(56) References Cited

U.S. PATENT DOCUMENTS 6,188,871 B1 2/2001 Kitamura et al.
2001/0036272 A1 11/2001 Hirayama
(Continued)

FOREIGN PATENT DOCUMENTS

CN 101379822 3/2009
CN 101496402 7/2009
(Continued)

*Primary Examiner* — Ian N Moore
*Assistant Examiner* — Brian T Le
(74) *Attorney, Agent, or Firm* — Jefferson IP Law, LLP (57) ABSTRACT

An apparatus and a method for transmitting uplink information in a broadcasting system are provided. A repeater of a mobile broadcasting system includes a plurality of transmitting stations each transmitting a broadcast signal for at least one broadcast service, a plurality of terminals receiving the broadcast signal for the at least one broadcast service through at least one transmitting station among the transmitting stations, and the repeater, the repeated being coupled between the plurality of transmitting stations and the plurality of terminals. The repeater includes a receiving unit configured to receive uplink information from the terminals, a control unit configured to classify the received uplink information by broadcast service and to create uplink information per broadcast service, and a transmitting unit configured to transmit the created uplink information to at least one corresponding transmitting station.

15 Claims, 9 Drawing Sheets

(56) References Cited

U.S. PATENT DOCUMENTS

| | | |
|---|---|---|
| 2004/0163101 A1 | 8/2004 | Swix et al. |
| 2008/0282286 A1 | 11/2008 | Or |
| 2009/0007203 A1 | 1/2009 | Drazin et al. |
| 2010/0046367 A1 | 2/2010 | Vermani et al. |
| 2010/0177789 A1* | 7/2010 | Chen ..................... H04L 63/20 370/477 |
| 2012/0300680 A1 | 11/2012 | Pietsch et al. |
| 2012/0300778 A1 | 11/2012 | Tamura |
| 2013/0322325 A1* | 12/2013 | Hahn ................ H04W 36/0055 370/315 |

FOREIGN PATENT DOCUMENTS

| | | |
|---|---|---|
| JP | H09-23274 A | 1/1997 |
| JP | H09-65308 A | 3/1997 |
| JP | H09-98411 A | 4/1997 |
| JP | H09-233459 A | 9/1997 |
| JP | H11-355224 A | 12/1999 |
| JP | 2000-224126 A | 8/2000 |
| JP | 2001-077775 A | 3/2001 |
| JP | 2001-508259 A | 6/2001 |
| JP | 2001-244902 A | 9/2001 |
| JP | 2001-345807 A | 12/2001 |
| JP | 2003-235026 A | 8/2003 |
| JP | 2010-166564 A | 7/2010 |
| JP | 2012-501101 A | 1/2012 |
| KR | 10-0469032 A | 5/2003 |
| KR | 10-0784066 A | 4/2007 |
| KR | 10-0801137 B1 | 2/2008 |
| KR | 10-2010-0091521 A | 8/2010 |
| WO | 2006/090395 A2 | 8/2006 |
| WO | 2011/072067 A1 | 6/2011 |

* cited by examiner

APPARATUS AND METHOD FOR TRANSMITTING UPLINK INFORMATION IN A BROADCASTING SYSTEM

CROSS-REFERENCE TO RELATED APPLICATION(S)

This application claims the benefit under 35 U.S.C. § 119(a) of a Korean patent application filed on Dec. 14, 2012 in the Korean Intellectual Property Office and assigned Serial No. 10-2012-0146642, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Industry-Academic Cooperation Foundation, Yonsei University.

TECHNICAL FIELD

The present disclosure relates to a broadcasting system. More particularly, the present disclosure relates to supporting a two-way mobile service without consuming communication network resources in a broadcasting system.

BACKGROUND

A typical mobile broadcasting system is evolving from a form of providing a one-way service into a form of providing a two-way service. For example, a 1st-generation mobile broadcasting system such as Digital Video Broadcasting—Handheld (DVB-H) and Terrestrial—Digital Multimedia Broadcasting (T-DMB) was of a form of providing only a one-way service. In order to meet ever-increasing demands for mobile broadcasting, a 2nd-generation mobile broadcasting system such as Digital Video Broadcasting—Next Generation Handheld (DVB-NGH) and Mobile Convergence Media (MCM) is being developed. In this 2nd-generation mobile broadcasting system, provision of a two-way service is being discussed.

In contrast, to provide a two-way mobile service, consideration is being taken into a heterogeneous network hybrid form of simultaneously using existing broadcast network and communication network. A configuration of this heterogeneous network hybrid form is inefficient because such a configuration consumes resources of the communication network in addition to the broadcast network. Moreover, the existing technologies are not proper for a broadcast situation because an extremely large number of users is not taken into consideration.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide an uplink information transmission apparatus and method capable of supporting a two-way mobile service without consuming communication network resources in a broadcasting system.

Another aspect of the present disclosure is to provide an uplink information transmission apparatus and method capable of supporting a two-way mobile service for massive users in a broadcasting system.

Aspects of the present disclosure are achieved by providing an apparatus and method for transmitting uplink information in a broadcasting system.

In accordance with an aspect of the present disclosure, a repeater of a mobile broadcasting system is provided. The repeater apparatus includes a plurality of transmitting stations, a plurality of terminals, and a repeater. Each of a plurality of transmitting stations transmits a broadcast signal for at least one broadcast service. The plurality of terminals receive the broadcast signal for the at least one broadcast service through at least one transmitting station among the transmitting stations. The repeater is coupled between the plurality of transmitting stations and the plurality of terminals. The repeater includes a receiving unit, a control unit, and a transmitting unit. The receiving unit is configured to receive uplink information from the terminals. The control unit is configured to classify the received uplink information by broadcast service and to generate uplink information per broadcast service. The transmitting unit is configured to transmit the generated uplink information to at least one corresponding transmitting station.

In accordance with another aspect of the present disclosure, a terminal among a plurality of terminals of a mobile broadcasting system is provided. The terminal apparatus includes a plurality of transmitting stations, the plurality of terminals, and a repeater. Each of the plurality of transmitting stations transmits a broadcast signal for at least one broadcast service. The plurality of terminals receive the broadcast signal for the at least one broadcast service through at least one transmitting station among the transmitting stations. The repeater is coupled between the plurality of transmitting stations and the plurality of terminals. The terminal apparatus includes a receiving unit, a control unit, and a transmitting unit. The receiving unit is configured to receive a broadcast signal from a transmitting station selected among the transmitting stations. The control unit is configured to generate uplink information to be transmitted to the selected transmitting station, using the received broadcast signal. The transmitting unit is configured to transmit the generated uplink information to the selected transmitting station through the repeater. The transmitted uplink information is classified by broadcast service by the repeater and then is transmitted to at least one corresponding transmitting station.

In accordance with another aspect of the present disclosure, a mobile broadcasting system is provided. The mobile broadcasting system includes a plurality of transmitting stations, a plurality of terminals, and a repeater. Each of a plurality of transmitting stations transmits a broadcast signal for at least one broadcast service. The plurality of terminals receive the broadcast signal for the at least one broadcast service through at least one transmitting station among the transmitting stations. The repeater is coupled between the plurality of transmitting stations and the plurality of terminals. The repeater apparatus is configured to receive uplink information from the terminals, classify the received uplink information by broadcast service and generate uplink information per broadcast service, and transmit the generated uplink information to at least one corresponding transmitting station.

In accordance with another aspect of the present disclosure, an operation method of a repeater in a mobile broadcasting system is provided. The operation method includes a plurality of transmitting stations, a plurality of terminals, and a repeater. Each of a plurality of transmitting stations transmits a broadcast signal for at least one broadcast service. The plurality of terminals receive the broadcast signal for the at least one broadcast service through at least one transmitting station among the transmitting stations. The repeater is coupled between the plurality of transmitting stations and the plurality of terminals. The method includes receiving uplink information from the terminals, classifying the received uplink information by broadcast service and generating uplink information per broadcast service, and transmitting the generated uplink information to at least one corresponding transmitting station.

In accordance with another aspect of the present disclosure, an operation method of a terminal among a plurality of terminals in a mobile broadcasting system is provided. The operation method includes a plurality of transmitting stations, the plurality of terminals, and a repeater. Each of a plurality of transmitting stations transmits a broadcast signal for at least one broadcast service. The plurality of terminals receive the broadcast signal for the at least one broadcast service through at least one transmitting station among the transmitting stations. The repeater is coupled between the plurality of transmitting stations and the plurality of terminals. The method includes receiving a broadcast signal from a transmitting station selected among the transmitting stations, generating uplink information to be transmitted to the selected transmitting station, using the received broadcast signal, and transmitting the generated uplink information to the selected transmitting station through the repeater. The transmitted uplink information is classified by broadcast service by the repeater and then is transmitted to at least one corresponding transmitting station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure relate to an apparatus and method capable of providing a two-way mobile service.

Below, various embodiments of FIGS. 1 to 9 used for describing the principles of the disclosure in this patent document are just for showing examples and should not be interpreted as limiting the scope and spirit of the disclosure. It will be understood by those skilled in the art that the various embodiments may be realized in an arbitrary broadcasting system in which the principles of the disclosure are properly arranged.

As a non-exhaustive illustration only, a terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Various embodiments of the present disclosure to be described below are to develop an existing downlink-oriented one-way broadcasting system into a two-way broadcasting system and to provide a service suitable for the two-way broadcasting system. An uplink system is used for collecting user data from users within broadcast service coverage. Various embodiments of the present disclosure propose a broadcast uplink system of a new form in which communication network dependency is removed, not a heterogeneous network hybrid form generally simultaneously using a broadcast network and a communication network. The arrangements of proposed content of the various embodiments of the present disclosure can be given as follows.

According to various embodiments of the present disclosure, a 'broadcast uplink repeater' to overcome an asymmetry between a wide downlink service coverage guaranteed by a high output transmitter (e.g., transmitting station) and a narrow uplink service coverage caused by a low output terminal is proposed.

According to various embodiments of the present disclosure, by installing the broadcast uplink repeater, uplink service coverage (e.g., a signal reaching distance from the terminal to the broadcast uplink repeater) may be maximized per uplink repeater, and the number of users to accept per uplink repeater may be maximized such that the minimal broadcast uplink repeater can be installed within the downlink service coverage.

According to various embodiments of the present disclosure, a required Signal-to-Noise Ratio (SNR) of a user signal received by the broadcast uplink repeater may be maximized and more radio resources may be allocated to a terminal-repeater network than a repeater-transmitter network. In addition, according to various embodiments of the present disclosure, to simultaneously process a large number of users, a total data quantity acceptable by the broadcast uplink repeater may be maximized, and a Multiple Access (MA) technique suitable for maximizing the total data quantity acceptable by the broadcast uplink repeater may be applied.

According various embodiments of the present disclosure propose a 'data re-multiplexing' technique in which, when the broadcast uplink repeater processes data, the broadcast uplink repeater efficiently classifies and re-processes the data and then effectively forwards the re-processed data to the transmitter (e.g., transmitting station). Also, to minimize computation and overhead required for re-multiplexing processing, the various embodiments of the present disclosure propose a technique of effectively re-processing data using a broadcasting IDentifier (ID).

According to various embodiments of the present disclosure, a simple and effective method is proposed in which, when the terminal constructs uplink data packets, the terminal can construct a packet header from currently received data, although separate data for packet construction are not inserted and forwarded to the terminal using a downlink broadcast network.

Various embodiments of the present disclosure will be described below in detail. First, the broadcast uplink repeater and a broadcasting system including the broadcast uplink repeater according to the various embodiments of the present disclosure will be described below. Next, an operation of generating uplink information in the terminal according to the various embodiments of the present disclosure will be described. Next, an operation of generating uplink information in the broadcast uplink repeater according to the various embodiments of the present disclosure will be described.

Broadcast Uplink Repeater

In a general mobile broadcasting system, a downlink service coverage guaranteed by a high output transmitting station and an uplink service coverage generated by a low output terminal are asymmetrical to each other. For example, the downlink service coverage is large relative to the uplink service coverage, while a low power signal of the low output terminal cannot even reach the transmitting station that is currently in service. Accordingly, various embodiments of the present disclosure consider a broadcasting system including a broadcast uplink repeater for broadcast uplink service.

However, the minimal broadcast uplink repeaters support the maximal terminals in the broadcasting system because the broadcasting system cannot easily increase the number of transmitting stations and the number of broadcast uplink repeaters unlike the wireless communication system. The broadcast uplink repeater of the broadcasting system accepts a large number of terminals because a service area of the broadcasting system is wider than the service area of the wireless communication system. For example, the number of terminals within one service area of the broadcasting system is significantly larger than the number of terminals within one service area of the communication system.

Figure 1:
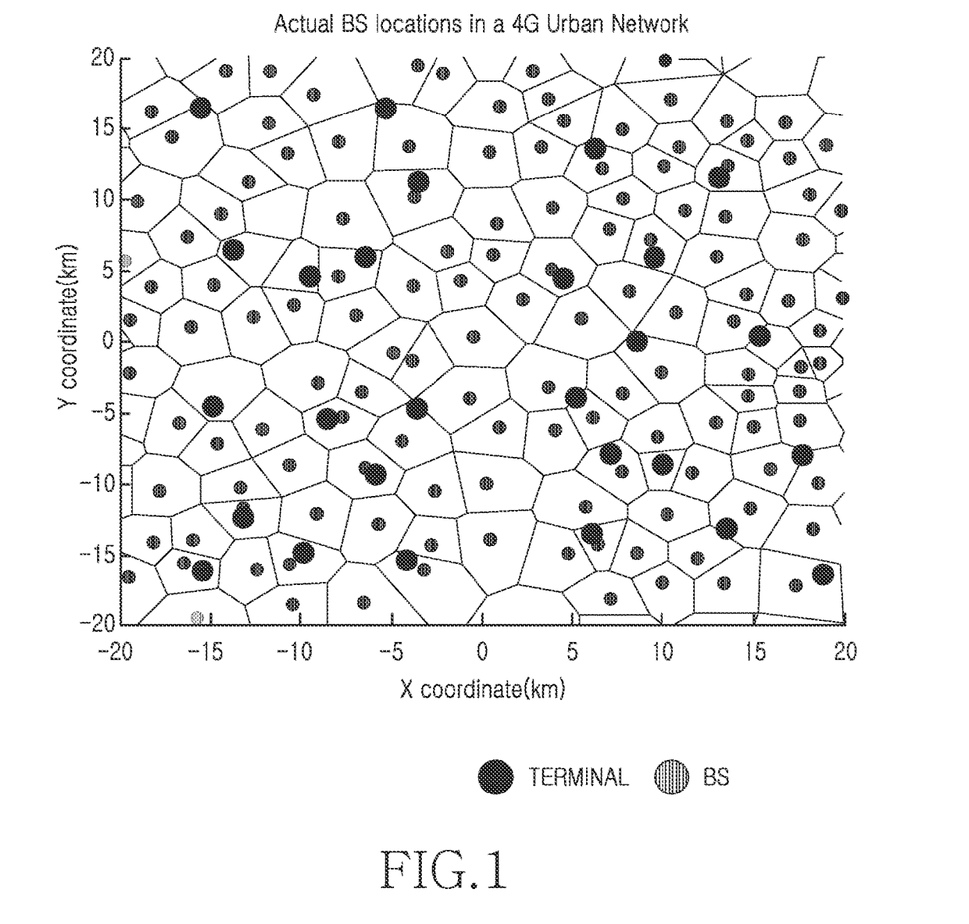
FIG. 1 is a diagram illustrating the distribution of Base Stations (BSs) and terminals in a general wireless communication system according to an embodiment of the present disclosure.

FIG. 1 is a diagram illustrating the distribution of Base Stations (BSs) and terminals in a general wireless communication system according to an embodiment of the present disclosure.

Figure 2:
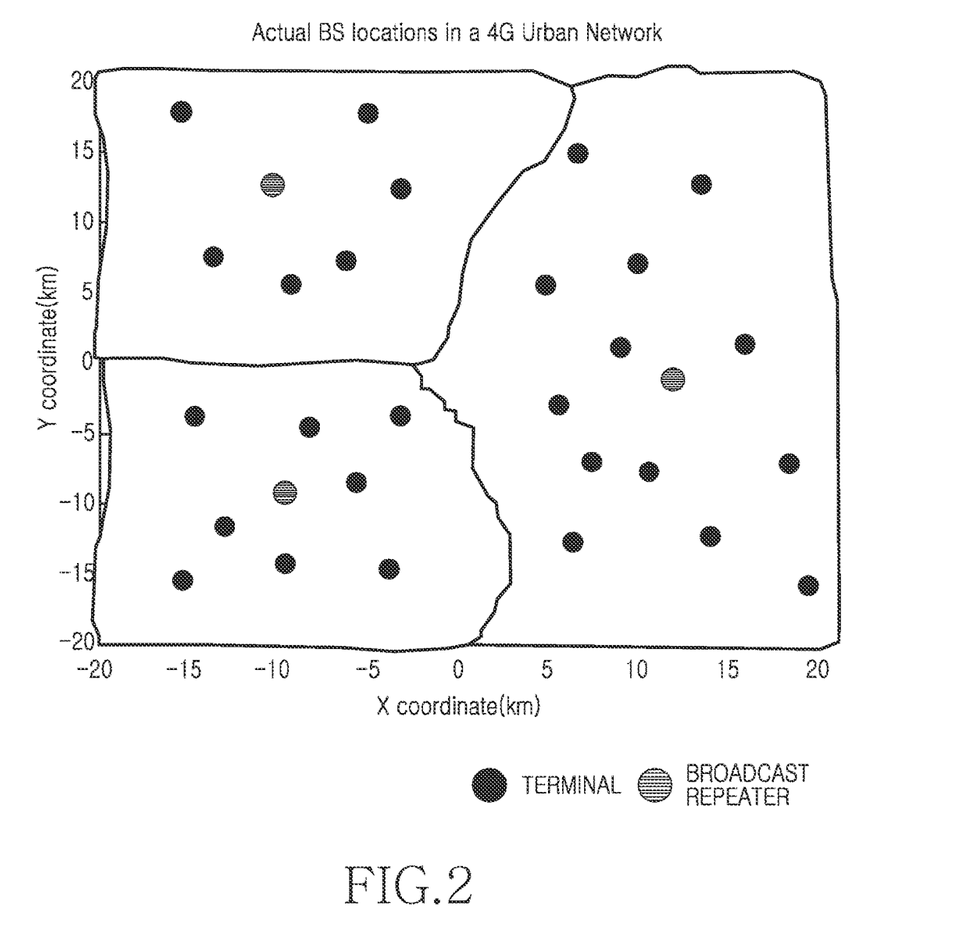
FIG. 2 is a diagram illustrating the distribution of broadcast uplink repeaters and terminals in a broadcasting system according to an embodiment of the present disclosure.

FIG. 2 is a diagram illustrating the distribution of broadcast uplink repeaters and terminals in a broadcasting system according to an embodiment of the present disclosure.

Referring to FIGS. 1 and 2, a BS of the wireless communication system accepts hundreds of users (terminals) within its own coverage as illustrated in FIG. 1, while the broadcast uplink repeater of the broadcasting system accepts millions of users (terminals) within its coverage as illustrated in FIG. 2.

Figure 3:
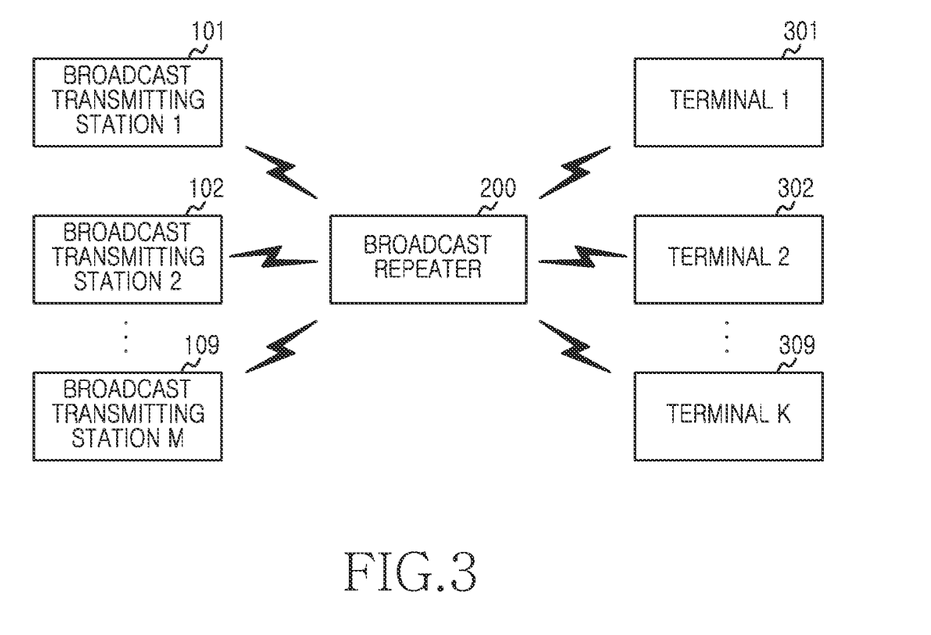
FIG. 3 is a diagram illustrating a configuration of a broadcasting system according to an embodiment of the present disclosure.

FIG. 3 is a diagram illustrating a configuration of a broadcasting system according to an embodiment of the present disclosure.

Referring to FIG. 3, the illustrated configuration of the broadcast system is merely provided as an example. According to various embodiments of the present disclosure, various other configurations of a broadcast system can be used without departing from the scope and spirit of the present disclosure.

As illustrated in FIG. 3, the broadcasting system includes a plurality of transmitting stations 101 to 109, a broadcast uplink repeater 200, and a plurality of terminals 301 to 309. The plurality (e.g., 'M' number, where M is a positive integer) of transmitting stations 101 to 109 each are for transmitting a broadcast signal for at least one broadcast service. For example, the transmitting stations 101 to 109 each can transmit a broadcast signal of a broadcasting station providing at least one broadcast service or a company besides the broadcasting station. The plurality (e.g., 'K' number, where K is a positive integer) of terminals 301 to 309 each receive the broadcast signal for the at least one broadcast service through at least one transmitting station among the transmitting stations 101 to 109. As an example, as discussed above, the terminal 301 to 309 may be a smart phone with a touch screen, and may be even any one of a portable terminal receiving provision of a broadcast service, a mobile phone, a mobile pad, a media player, a tablet computer, a handheld computer, a PDA, and the like.

According to various embodiments of the present disclosure, a broadcasting system can perform an uplink operation as well as a downlink operation because providing a two-way service. In a case of downlink of the broadcasting system, the plurality of transmitting stations 101 to 109 function as broadcast downlink transmitters, and the plurality of terminals 301 to 309 function as broadcast downlink receivers. In contrast, in a case of uplink of the broadcasting system, the plurality of terminals 301 to 309 function as broadcast uplink transmitters, and the plurality of transmitting stations 101 to 109 function as broadcast uplink receivers.

The broadcast uplink repeater 200 is coupled between the plurality of transmitting stations 101 to 109 and the plurality of terminals 301 to 309. In installing the broadcast uplink repeater 200, the broadcast uplink repeater 200 transmits uplink information of the plurality of terminals 301 to 309 to the plurality of transmitting stations 101 to 109. According to various embodiments of the present disclosure, uplink service coverage (e.g., a signal reaching distance from the terminal to the broadcast uplink repeater) is maximized per uplink repeater, and the number of users to accept per uplink repeater is maximized such that the minimal broadcast uplink repeater can be installed within the downlink service coverage. According to various embodiments of the present disclosure, a required SNR of a user signal received by the broadcast uplink repeater is minimized, and more radio resources are allocated to a terminal-repeater network than a repeater-transmitter network. In addition, according to various embodiments of the present disclosure, to simultaneously process a large number of users a total data quantity acceptable by the broadcast uplink repeater is maximized, and a multiple access (MA) technique suitable for maximizing the total data quantity acceptable by the broadcast uplink repeater.

Broadcast Uplink Information

Unlike a wireless communication environment, two-way communication is not smooth at broadcast uplink. Therefore, when constructing uplink information such as a return channel packet, use of existing information simultaneously known by the transmitting station and the terminal is more effective than defining and using a new ID or overhead and the like.

The uplink information is constructed using a user ID and return channel data. In addition to or as an alternative to the user ID and the return channel data, a broadcasting ID containing information about broadcast contents (service) on which a return channel targets, and a target ID including information about a final destination for uplink packets are added to a construction of the uplink information. If separate data for generating the target ID and the broadcasting ID is transmitted with a downlink broadcast signal, such separate data introduces a waste of resources. As a result, according to various embodiments of the present disclosure, a simple method of constructing uplink information using broadcasting information that is being currently serviced to a terminal through downlink is proposed. For example, according to various embodiments of the present disclosure, in order to receive a downlink service from a broadcasting station, the terminal generates a unique ID of a current service from information acquired from a broadcast signal of the broadcasting station. For example, if the broadcasting station is Korean Broadcasting System 1 (KBS1), a unique ID of a current service can be generated from a broadcasting station number, a channel frequency of 475 MHz, a channel number of '9', program information contained within a Moving Picture Expert Group-2 Transport Stream (MPEG-2 TS) packet, and the like. As a result, according to various embodiments of the present disclosure, common information known by the transmitting station, the broadcast uplink repeater, and the terminal are uniquely configured and shared so as to maximize the efficiency of a bandwidth because separate additional transmission may not be required.

Figure 6:
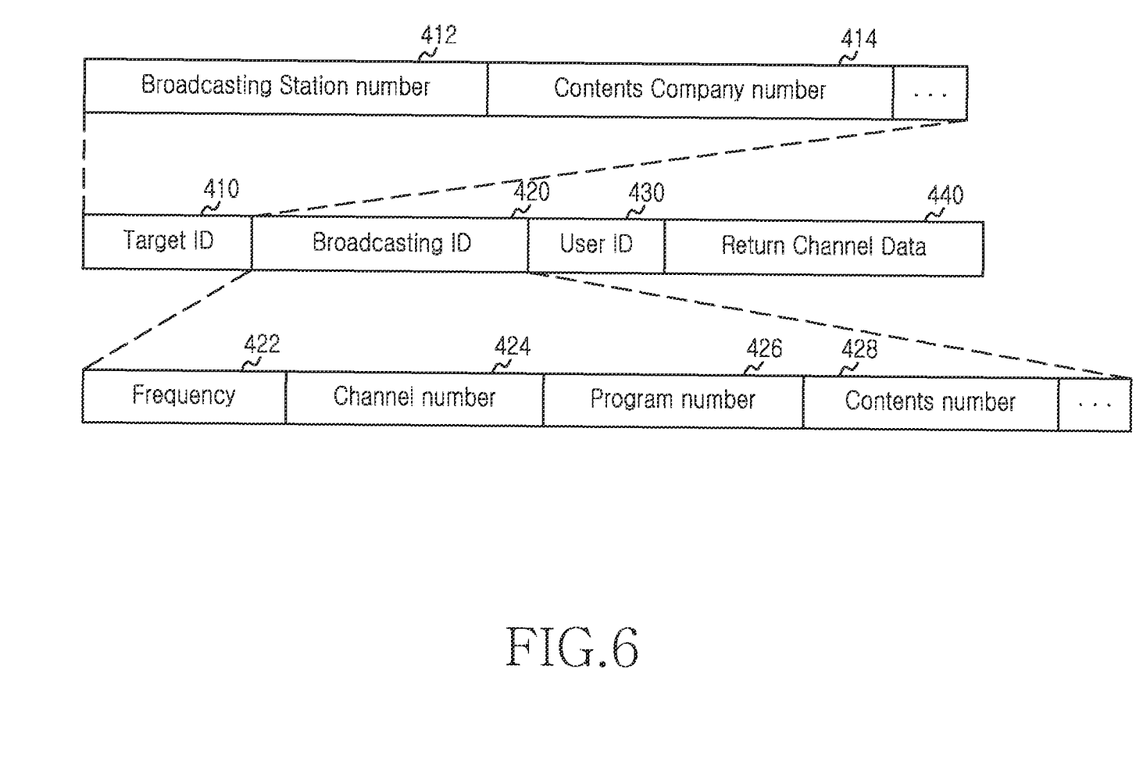
FIG. 6 is a diagram illustrating a structure of uplink information generated in a terminal according to an embodiment of the present disclosure.

FIG. 6 is a diagram illustrating a structure of uplink information generated in a terminal according to an embodiment of the present disclosure.

Referring to FIG. 6, the illustrated structure is merely provided as an example. According to various embodiments of the present disclosure, various other structures can be used without departing from the scope and spirit of the present disclosure.

The uplink information includes a target ID 410, a broadcasting ID 420, a user ID 430, and return channel data 440. The target ID 410 includes a broadcasting station number 412 and a contents company number 414 indicating a number of an information (e.g., contents) collection company in addition to or as an alternative to a broadcasting station. For example, the target ID 410 includes the number 412 of the broadcasting station which is to receive a return channel, and the number 414 of the company such as the information collection company which is to receive the return channel besides the broadcasting station. The broadcasting ID 420 includes information about a broadcast service corresponding to the return channel. For example, the broadcasting ID 420 includes basic information for finding the broadcast service, such as a broadcast frequency 422 through which service is being provided, a channel number 424, a unique number (e.g., program number) 426 of a program within the broadcast service, and a unique number (e.g., contents number) 428 of contents within the program.

Figure 4:
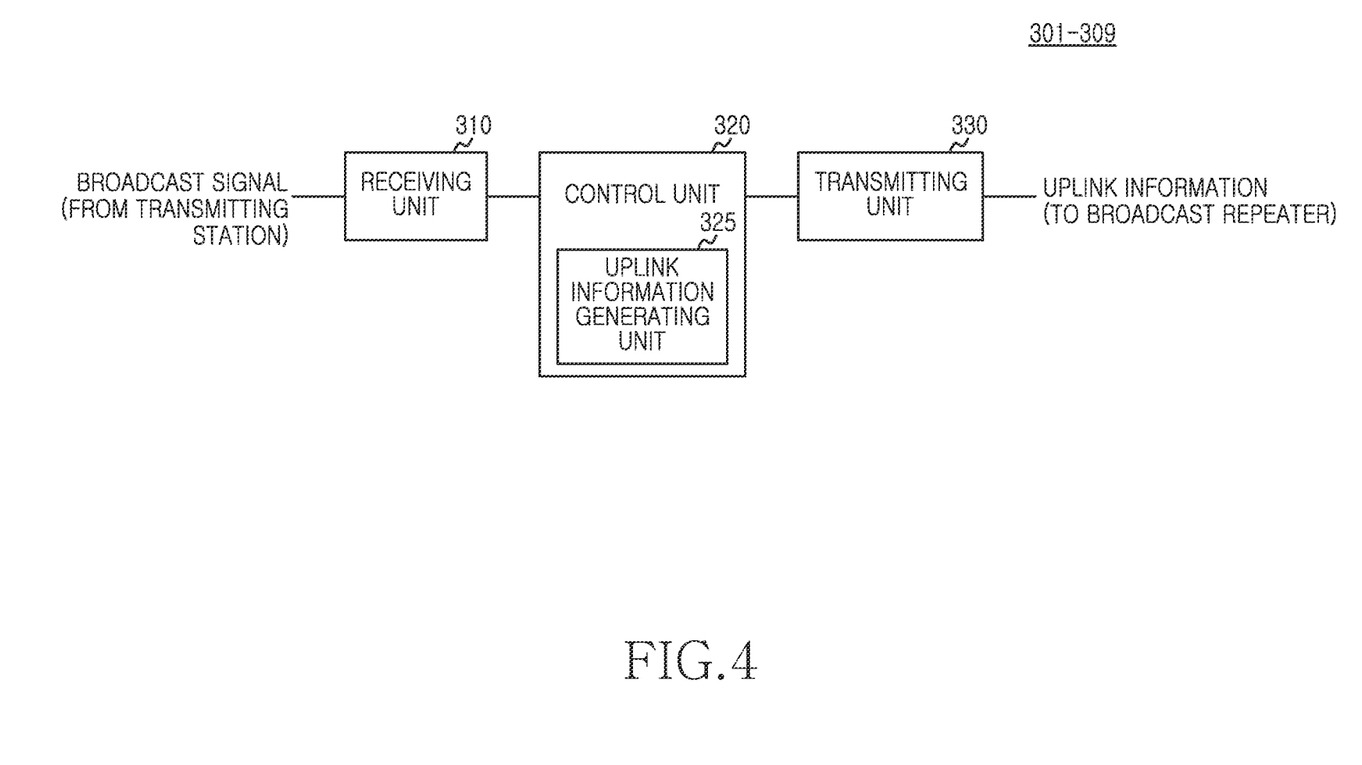
FIG. 4 is a block diagram illustrating a configuration of a terminal according to an embodiment of the present disclosure.

FIG. 4 is a block diagram illustrating a configuration of a terminal according to an embodiment of the present disclosure.

Referring to FIG. 4, the illustrated configuration is provided merely as an example. According to various embodiments of the present disclosure, various configurations can be used without departing from the scope and spirit of the present disclosure.

As illustrated in FIG. 3, the terminals 301 to 309 each include a receiving unit 310, a control unit 320, and a transmitting unit 330.

The receiving unit 310 receives a broadcast signal from a transmitting station selected among the transmitting stations 101 to 109 illustrated in FIG. 3.

The control unit 320 includes an uplink information generating unit 325, and generates uplink information to be transmitted to the selected transmitting station, using the received broadcast signal.

The transmitting unit 330 transmits the generated uplink information to the selected transmitting station through the broadcast uplink repeater 200 illustrated in FIG. 3. The uplink information transmitted by the transmitting unit 330 includes, as illustrated in FIG. 6, user information 430 about the terminal, target information 410 representing a destination of the uplink information, broadcasting information 420 representing broadcast service information, and return channel information 440. The transmitted uplink information is classified by broadcast service by the broadcast uplink repeater 200 and then is transmitted to at least one or more corresponding transmitting stations.

Figure 5:
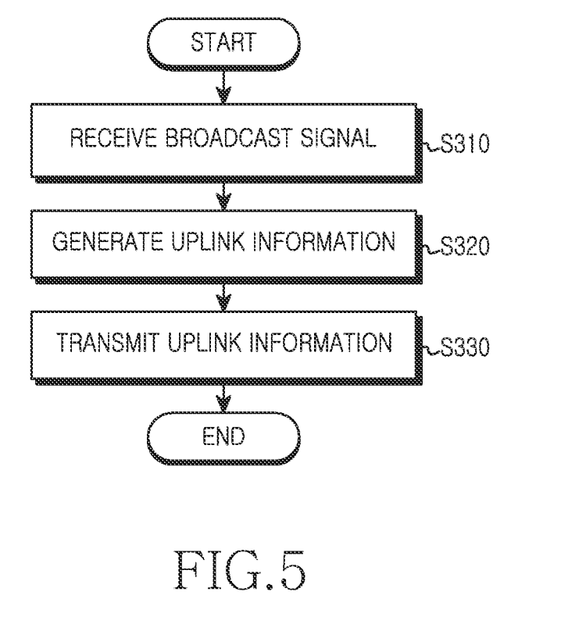
FIG. 5 is a flowchart illustrating an operation of processing uplink information in a terminal according to an embodiment of the present disclosure.

FIG. 5 is a flowchart illustrating an operation of processing uplink information in a terminal according to an embodiment of the present disclosure.

Referring to FIG. 5, the illustrated flowchart is provided merely as an example. According to various embodiments of the present disclosure, various other operations can be used without departing from the scope and spirit of the present disclosure.

At operation S310, the terminal receives a broadcast signal from a transmitting station selected among the transmitting stations 101 to 109 illustrated in FIG. 3.

At operation S320, the terminal generates uplink information to be transmitted to the selected transmitting station, using the received broadcast signal.

At operation S330, the terminal transmits the uplink information. For example, at operation S330, the terminal transmits the generated uplink information to the selected transmitting station through the broadcast uplink repeater 200 illustrated in FIG. 3. The transmitted uplink information includes, as illustrated in FIG. 6, user information 430 about the terminal, target information 410 representing a destination of the uplink information, broadcasting information 420 representing broadcast service information, and return channel information 440. The transmitted uplink information is classified by broadcast service by the broadcast uplink repeater 200 and then is transmitted to at least one or more corresponding transmitting stations.

Uplink Repeater

Figure 9:
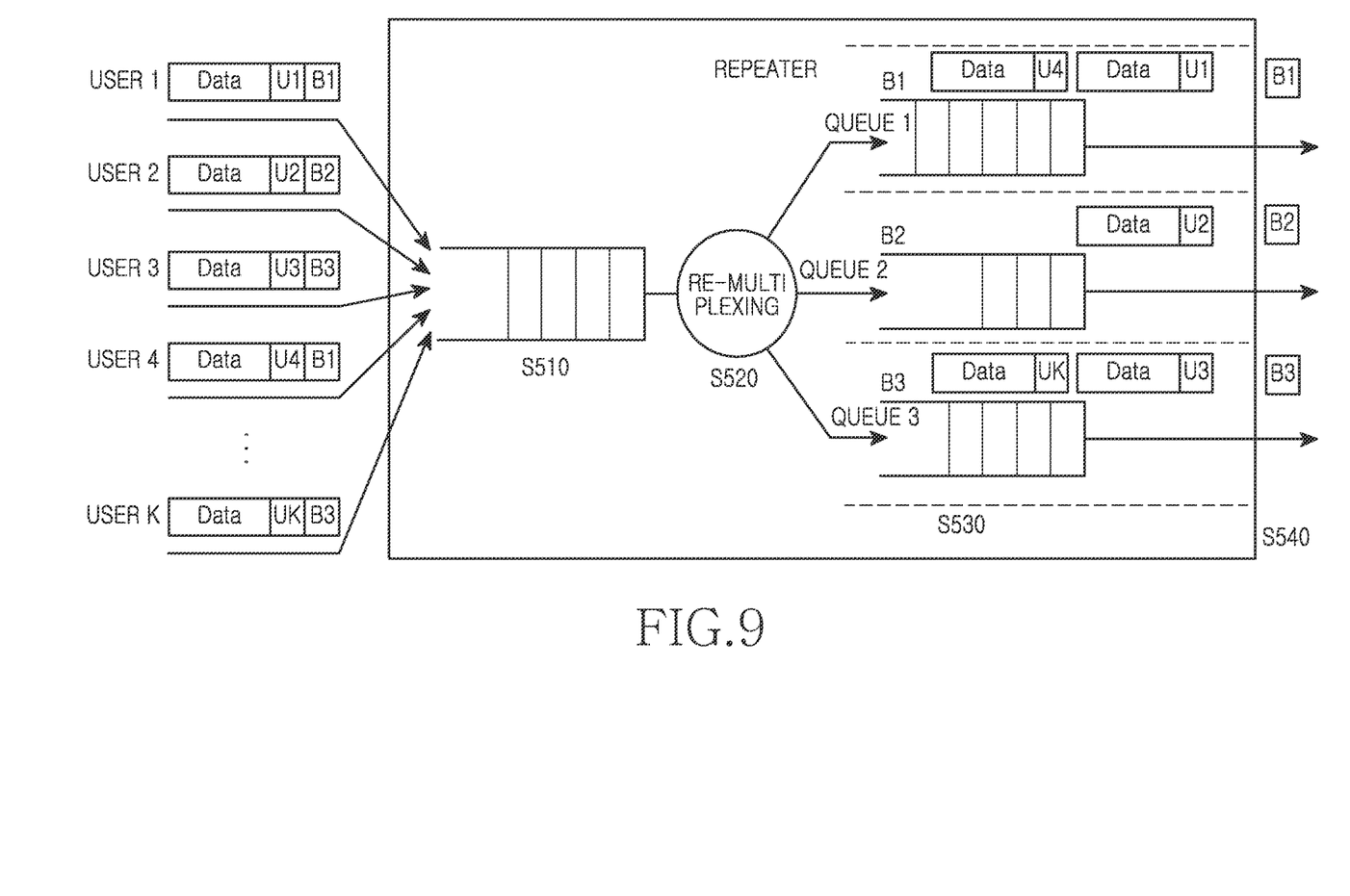
FIG. 9 is a diagram illustrating a detailed operation in which uplink information is classified by transmitting station and uplink information per transmitting station is generated and transmitted to a corresponding transmitting station in a broadcast uplink repeater according to an embodiment of the present disclosure.

An uplink repeater of a general wireless communication system plays a role of retransmitting a signal of each terminal to a BS in an individual-user-customized form. In contrast, according to various embodiments of the present disclosure, a broadcast uplink repeater digests high-capacity data of terminals received from massive users. In addition, if the broadcast uplink repeater simply performs only retransmission of the data of the terminals, then as a result, a reception computation quantity to process in the transmitting station greatly increases, a an ACKnowledgement (ACK) send time is delayed, and a complexity of the broadcast uplink repeater is increased. In addition, at a time when the terminal forwards broadcast uplink data up to the transmitting station, the user ID is used as in the wireless communication system. However, in a case of broadcast uplink, the broadcasting ID is additionally used as illustrated in FIG. 6. If the broadcasting ID is retransmitted between the broadcast uplink repeater and the transmitting station, a transmission overhead can increase and the transmitting station may have a burden of having to classify data of all terminals within a service area by corresponding broadcast service and having to send the data to each service provider. Consequently, according to various embodiments of the present disclosure, the broadcast uplink repeater classifies and re-multiplexes, as illustrated in FIG. 9, the data of each terminal on a basis of the broadcasting ID. For example, the broadcast uplink repeater classifies and re-multiplexes the data by broadcast service.

Figure 7:
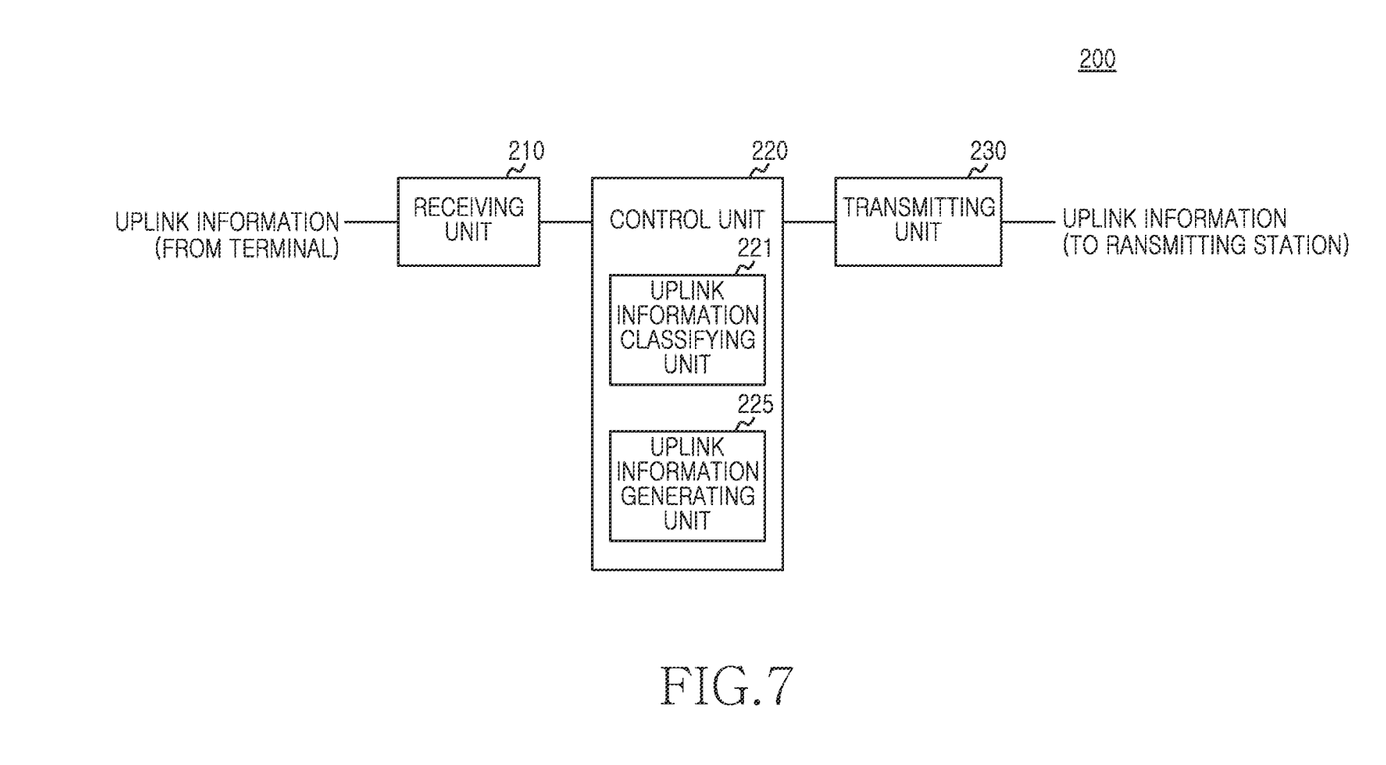
FIG. 7 is a block diagram illustrating a configuration of a broadcast uplink repeater according to an embodiment of the present disclosure.

FIG. 7 is a block diagram illustrating a configuration of a broadcast uplink repeater according to an embodiment of the present disclosure.

Referring to FIG. 7, the illustrated configuration is provided merely as an example. According to various embodiments of the present disclosure, various configurations can be used without departing from the scope and spirit of the present disclosure.

As illustrated in FIG. 7, the broadcast uplink repeater 200 includes a receiving unit 210, a control unit 220, and a transmitting unit 230.

The receiving unit 210 receives uplink information from the terminals 301 to 309 illustrated in FIG. 3. As illustrated in FIG. 6, the received uplink information includes user information 430 about the terminal, target information 410 representing a destination of the uplink information, broadcasting information 420 representing broadcast service information, and return channel information 440.

The control unit 220 classifies the received uplink information by broadcast service and generates uplink information per broadcast service. According to various embodiments of the present disclosure, the control unit 220 includes an uplink information classifying unit 221 and an uplink information generating unit 225. As an example, the uplink information classifying unit 221 classifies the received uplink information by broadcast service. As an example, the uplink information generating unit 225 may generate uplink information per broadcast service. The generated uplink information includes the user information 430 about the terminal, the target information 410 representing the destination of the uplink information, and the return channel information 440 among the information illustrated in FIG. 6.

The transmitting unit 230 transmits the generated uplink information to at least one or more corresponding transmitting stations. The transmitting unit 230 can transmit the generated uplink information to the at least one or more corresponding transmitting stations in an Orthogonal Frequency Division Multiple Access (OFDMA) scheme or a Single Carrier—Code Frequency Division Multiple Access (SC-CFDMA) scheme. If a large number of users crowd on one channel such as, for example, when users watch the World Cup relay (e.g., if the broadcasting ID is less in type compared to the user ID), then the transmitting unit 230 selects OFDMA as an MA technique between the broadcast uplink repeater and the transmitting station, thereby enabling high-speed transmission. In contrast, if the large number of users use a plurality of channels such as, for example, when watching weekend entertainment channel shows, and if the target ID also becomes various because desired information is various, then the transmitting station 230 uses SC-CFDMA providing a low transfer rate of data of each terminal but being suitable for accepting a large maximum number of users, thereby enabling efficient transmission.

Figure 8:
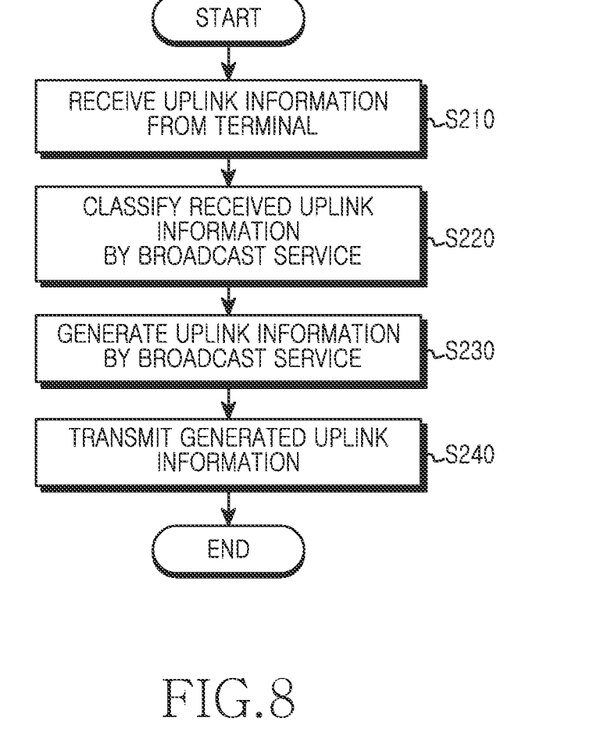
FIG. 8 is a flowchart illustrating an operation of processing uplink information in a broadcast uplink repeater according to an embodiment of the present disclosure.

FIG. 8 is a flowchart illustrating an operation of processing uplink information in a broadcast uplink repeater according to an embodiment of the present disclosure.

Referring to FIG. 8, the operation is provided merely as an example. According to various embodiments of the present disclosure, various operations can be used without departing from the scope and spirit of the present disclosure.

At operation S210, the broadcast uplink repeater receives uplink information from the terminals 301 to 309 illustrated in FIG. 3. As illustrated in FIG. 6, the received uplink information includes user information 430 about the terminal, target information 410 representing a destination of the uplink information, broadcasting information 420 representing broadcast service information, and return channel information 440.

At operation S220, the broadcast uplink repeater classifies the received uplink information by broadcast service.

At operation S230, generates uplink information per broadcast service. The generated uplink information includes the user information 430 about the terminal, the target information 410 representing the destination of the uplink information, and the return channel information 440 among the information illustrated in FIG. 6.

At operation S240, the broadcast uplink repeater transmits the generated uplink information to at least one or more corresponding transmitting stations. The broadcast uplink repeater can transmit the generated uplink information to the at least one or more corresponding transmitting stations in an OFDMA scheme or a SC-CFDMA scheme.

FIG. 9 is a diagram illustrating a detailed operation in which uplink information is classified by broadcast service and uplink information per broadcast service is generated and transmitted to a corresponding transmitting station in a broadcast uplink repeater according to an embodiment of the present disclosure.

Referring to FIG. 9, 'B1' to 'B3' denote broadcasting IDs, 'U1' to 'UK' denote user IDs, and 'Data' denotes return channel data.

At operation S510, the broadcast uplink repeater receives uplink information (packets) from respective terminals.

At operation S520, the broadcast uplink repeater reads broadcasting IDs located in header portions of the uplink information, and classifies and re-multiplexes the uplink information by broadcasting ID. For example, the broadcast uplink repeater classifies the uplink information by broadcast service and generates uplink information per broadcast service.

At operation S530, the broadcast uplink repeater forwards the generated uplink information to queues corresponding to the broadcasting IDs. At this time, the broadcasting IDs have been removed from the forwarded uplink information. The queue per broadcasting ID collects only data that go toward the same destination (e.g., the same broadcasting station). For example, uplink information from a user 1 and a user 4 corresponding to a broadcasting ID "B1" are stored in a queue 1, and uplink information from a user 2 corresponding to a broadcasting ID "B2" is stored in a queue 2, and uplink information from a user 3 and a user K corresponding to a broadcasting ID "B3" are stored in a queue 3. According to various embodiments of the present disclosure, the processes are identically performed for all uplink information received from other terminals.

At operation S540, the broadcast uplink repeater may have as many transmission bundles as the number of broadcast services, and transmits the transmission bundles to transmitting stations through an independent transmission path or identification code per bundle capable of identifying the transmission bundles.

For example, at operation S540, the broadcast uplink repeater adds the broadcasting ID corresponding to the uplink information stored in each queue and then, transmits the uplink information to a corresponding transmitting station.

According to various embodiments of the present disclosure, because some of the broadcasting IDs are removed, an overhead of data reaching the transmitting station is decreased, and because even a classification computation process to process in the transmitting station is omitted, the above-described process may be very efficient. For example, in a case of FIG. 9, because the uplink information of the user 1 and the uplink information of the user 4 use the same broadcasting ID (e.g., 'B 1'), the broadcast uplink repeater deletes one of the same broadcasting ID without needing to transmit the same broadcasting ID twice and instead, transmits only one common representative broadcasting ID (e.g., 'B1') to a corresponding transmitting station.

In contrast, the broadcast uplink repeater first reads a target ID sent by the terminal and determines if a broadcasting station is identical to a transmitting station which will receive a return channel of a company requiring a different return channel. If the broadcasting station is different from the transmitting station which will receive the return channel of the company requiring the different return channel, the broadcast uplink repeater distinguishes the transmitting station which is to receive the corresponding return channel. If the broadcasting station is identical to the transmitting station which will receive the return channel of the company requiring the different return channel, the broadcast uplink repeater can read the target ID from the transmitting station and classify the return channel according to the corresponding broadcasting station or the company requiring information.

The broadcasting station having received the return channel through the target ID or the company using the return channel can recognize if the return channel is a return channel for any broadcast service through the broadcasting ID. Thereafter, the broadcasting station or the company finishes receiving and processing a broadcast uplink signal using the user ID and the return channel data.

As described above, according to various embodiments of the present disclosure, a broadcast uplink repeater for overcoming an asymmetry of service coverage between a high output transmitting station and a low output terminal in a broadcasting system is proposed. The broadcast uplink repeater is realized to maximize an uplink service coverage per broadcast uplink repeater and the number of users to accept per broadcast uplink repeater. In addition, the broadcast uplink repeater can simultaneously process a large number of users using a multiple access technique. In addition, by efficiently classifying and re-processing uplink information from the terminal and then forwarding the uplink information to the transmitting station, the broadcast uplink repeater can reduce an overhead in transmitting the uplink information. In addition, the terminal can simply configure the uplink information by using data included in a received broadcast signal, not separate downlink data, in constructing the uplink information.

The present disclosure has been described by limited various embodiments and drawings. However, the description of the various embodiments of the present disclosure does not intend to limit the scope and spirit of the present disclosure. From the present disclosure, various modification and changes can be made by a person having ordinary skill in the art to which the present disclosure belongs. For example, as illustrated in FIG. 3, various embodiments of the present disclosure describe a single broadcast uplink repeater that is coupled between a plurality of transmitting stations and a plurality of terminals. However, such a description does not intend to necessarily limit the scope and spirit of the present disclosure. For another example, it has been described that the various embodiments of the present disclosure are implemented by constituent elements of the terminal and the broadcast uplink repeater illustrated respectively in FIG. 4 and FIG. 7, but this is for convenience of description and it is obvious that the terminal and the broadcast uplink repeater include various constituent elements as well as the illustrated constituent elements.

According to various embodiments of the present disclosure operations can be realized by a single control unit. In this case, a program instruction for performing an operation realized by various computers can be recorded in a non-transitory computer-readable medium. The non-transitory computer-readable medium can include a program instruction, a data file, a data structure and the like singularly or in combination. The program instruction can be an instruction specially designed and configured for the present disclosure or can be an instruction known to and available by those skilled in the art. An example of the non-transitory computer-readable recording medium includes a magnetic medium such as a hard disk, a floppy disk and a magnetic tape, an optical recording medium such as a Compact Disk ROM (CD-ROM) or a Digital Versatile Disk (DVD), a magnetic-optic medium such as a floptical disk, and a hardware device specially constructed to store and perform the program instruction such as a Read Only Memory (ROM), a Random Access Memory (RAM), a flash memory and the like. An example of the program instruction includes not merely a machine language code such as a code made by a compiler but also a high level language code that is executable by a computer using the interpreter and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile broadcasting system comprising:
a first terminal including a transceiver configured to receive a broadcast signal and at least one processor configured to generate a first uplink signal comprising a first broadcast service identifier (ID) and first data using the broadcast signal;
a second terminal;
a repeater; and
a transmitting station for providing a broadcast service,
wherein the transceiver is further configured to transmit the first uplink signal to the repeater,
wherein a second uplink signal comprising a second broadcast service ID and second data is transmitted from the second terminal to the repeater,
wherein, in response to the first broadcast service ID matching the second broadcast service ID, the first broadcast service ID and the second broadcast service ID are removed, by the repeater, from the first uplink signal and the second uplink signal, respectively, to store the first data and the second data in a queue corresponding to the broadcast service identified by the first broadcast ID and the second broadcast ID, and generate, by the repeater, a third uplink signal comprising the first data and the second data based on information stored in the queue, and
wherein the third uplink signal is transmitted from the repeater to a transmitting station corresponding to the broadcast service identified by the first broadcast service ID and the second broadcast service ID.

2. The mobile broadcasting system of claim 1, wherein the first uplink signal further comprises user information of the first terminal, target information representing a destination of the first uplink signal and return channel information of the first data.

3. The mobile broadcasting system of claim 1, wherein the third uplink signal comprises user information of the first terminal, user information of the second terminal, target information representing a destination of the third uplink signal, and return channel information of each of the first data and the second data.

4. A method for operating a repeater in a mobile broadcasting system, the method comprising:
receiving a first uplink signal comprising a first broadcast service identifier (ID) and first data from a first terminal and a second uplink signal comprising a second broadcast service ID and second data from a second terminal;
determining whether the first broadcast service ID matches the second broadcast service ID;
in response to the first broadcast service ID matching the second broadcast service ID, removing the first broadcast service ID and the second broadcast service ID included in the first uplink signal and the second uplink signal, respectively, and storing the first data and the second data in a queue corresponding to a broadcast service identified by the first broadcast ID and the second broadcast ID;
generating a third uplink signal comprising the first data and the second data based on information stored in the queue; and
transmitting the third uplink signal to a transmitting station corresponding to the broadcast service identified by the first broadcast service ID and the second broadcast service ID.

5. The method of claim 4, wherein the first uplink signal further comprises user information of the first terminal, target information representing a destination of the first uplink signal and return channel information of the first data.

6. The method of claim 4, wherein the transmitting of the third uplink signal comprises transmitting the third uplink signal using an orthogonal frequency division multiple access (OFDMA) scheme or a single carrier-code frequency division multiple access (SC-CFDMA) scheme.

7. A method for operating a mobile broadcasting system, the method comprising:
receiving a broadcast signal by a first terminal in the mobile broadcasting system;
generating a first uplink signal comprising a first broadcast service identifier (ID) and first data using the broadcast signal, by the first terminal;
receiving the first uplink signal by a repeater;
receiving a second uplink signal comprising a second broadcast service ID and second data is transmitted from a second terminal by the repeater;
in response to the first broadcast service ID matching the second broadcast service ID, removing, by the repeater, the first broadcast ID and the second broadcast ID from the first uplink signal and the second uplink signal, respectively, storing, by the repeater, the first data and the second data in a queue corresponding to a broadcast service identified by the first broadcast ID and the second broadcast ID, and generating, by the repeater, a third uplink signal comprising the first data and the second data based on information stored in the queue; and
transmitting, the third uplink signal, by the repeater, to a transmitting station corresponding to the broadcast service identified by the first broadcast service ID and the second broadcast service ID.

8. The method of claim 7, wherein the first uplink signal further comprises user information of the first terminal, target information representing a destination of the first uplink signal and return channel information of the first data.

9. The method of claim 7, wherein the third uplink signal comprises user information of the first terminal, user information of the second terminal, target information representing a destination of the third uplink signal, and return channel information of each of the first data and the second data.

10. A non-transitory computer-readable storage medium storing instructions that, when executed, cause a processor to perform the method of claim 4.

11. A non-transitory computer-readable storage medium storing instructions that, when executed, cause a processor to perform the method of claim 7.

12. A repeater of a mobile broadcasting system, the repeater comprising:
a transceiver configured to receive a first uplink signal comprising first broadcast service identifier (ID) and first data, from a first terminal, and a second uplink signal comprising second broadcast service ID and second data, from a second terminal; and
at least one processor configured to:
determine whether the first broadcast service ID matches the second broadcast service ID,
in response to the first broadcast service ID matching the second broadcast service ID, remove the first broadcast service ID and the second broadcast service ID included in the first uplink signal and the second uplink signal, respectively, and store the first data and the second data in a queue corresponding to a broadcast service identified by the first broadcast ID and the second broadcast ID, and
generate a third uplink signal comprising the first data and the second data based on information stored in the queue,
wherein the transceiver is further configured to transmit the third uplink signal to a transmitting station corresponding to the broadcast service.

13. The repeater of claim 12, wherein the first uplink signal further comprises user information of the first terminal, target information representing a destination of the first uplink signal, and return channel information of the first data.

14. The repeater of claim 12, wherein the third uplink signal comprises user information of the first terminal, user information of the second terminal, target information representing a destination of the third uplink signal, and return channel information of each of the first data and the second data.

15. The repeater of claim 12, wherein the transceiver is further configured to transmit the third uplink signal using an orthogonal frequency division multiple access (OFDMA) scheme or a single carrier-code frequency division multiple access (SC-CFDMA) scheme.

* * * * *